United States Patent
Jiang et al.

(10) Patent No.: US 11,523,211 B2
(45) Date of Patent: Dec. 6, 2022

(54) METHOD AND DEVICE FOR GENERATING SYNTHETIC VORTEX SOUND FIELD WITH MORE MODE NUMBER

(71) Applicants: CHENGDU INSTITUTE OF BIOLOGY, CHINESE ACADEMY OF SCIENCES, Sichuan (CN); UNIVERSITY OF ELECTRONIC SCIENCE AND TECHNOLOGY OF CHINA, Sichuan (CN)

(72) Inventors: Haibo Jiang, Sichuan (CN); Xinyang He, Sichuan (CN); Yubin Gong, Sichuan (CN); Dan Tang, Sichuan (CN); Yang Yang, Sichuan (CN); Zijun Chen, Sichuan (CN); Jiangnan Fu, Sichuan (CN); Yuan Gao, Sichuan (CN)

(73) Assignees: CHENGDU INSTITUTE OF BIOLOGY, CHINESE ACADEMY OF SCIENCES, Sichuan (CN); UNIVERSITY OF ELECTRONIC SCIENCE AND TECHNOLOGY OF CHINA, Sichuan (CN)

(*) Notice: Subject to any disclaimer, the term of this patent is extended or adjusted under 35 U.S.C. 154(b) by 0 days.

(21) Appl. No.: 17/597,395

(22) PCT Filed: Jan. 26, 2021

(86) PCT No.: PCT/CN2021/073843
§ 371 (c)(1),
(2) Date: Jan. 4, 2022

(87) PCT Pub. No.: WO2022/151525
PCT Pub. Date: Jul. 21, 2022

(65) Prior Publication Data
US 2022/0360889 A1 Nov. 10, 2022

(30) Foreign Application Priority Data
Jan. 18, 2021 (CN) .......................... 202110065122.9

(51) Int. Cl.
*H04R 1/40* (2006.01)

(52) U.S. Cl.
CPC .................................. *H04R 1/403* (2013.01)

(58) Field of Classification Search
CPC ..................................................... H04R 1/403
See application file for complete search history.

(56) References Cited

U.S. PATENT DOCUMENTS

| 4,882,760 A | * | 11/1989 | Yee | .......................... | H04R 1/26 381/186 |
| 11,445,294 B2 | * | 9/2022 | Koschak | .............. | G10K 11/178 |

(Continued)

FOREIGN PATENT DOCUMENTS

| CN | 1652723 A | 8/2005 |
| CN | 101588524 A | 11/2009 |

(Continued)

*Primary Examiner* — Jason R Kurr
(74) *Attorney, Agent, or Firm* — Novick, Kim & Lee, PLLC; Allen Xue

(57) ABSTRACT

A method and device for generating synthetic vortex sound field (SVSF) with more mode number includes the following steps: (1) a transducer array composed of N transducer units is constructed, and each transducer unit emits a sound field to generate an initial sound field; (2) at the same time, the position of the transducer unit and the phase of the sound field emitted by each transducer unit are changed, and each change produces a sound field, and thus changings times produces of sound fields, wherein the way to change the position of the transducer unit is to rotate the transducer array as a whole; (3) the initial sound field is superimposed with s of sound fields generated in step (2), to obtain SVSF with more mode number. The method and device for gen- (Continued)

erating vortex sound field (VSF) can be used for underwater communication or acoustic imaging.

9 Claims, 7 Drawing Sheets

(56) References Cited

U.S. PATENT DOCUMENTS

| | | |
|---|---|---|
| 2004/0217675 A1 | 11/2004 | Desilets et al. |
| 2020/0158694 A1 | 5/2020 | Garlepp et al. |

FOREIGN PATENT DOCUMENTS

| | | | |
|---|---|---|---|
| CN | 105750181 A | 7/2016 | |
| CN | 106125771 A | 11/2016 | |
| CN | 108348218 A | 7/2018 | |
| CN | 109261472 A | 1/2019 | |
| CN | 110475188 A | 11/2019 | |
| CN | 110522992 A | 12/2019 | |
| CN | 110730042 A | 1/2020 | |
| CN | 111740223 A | 10/2020 | |
| CN | 112083432 A | 12/2020 | |
| GB | 2410130 A | 7/2005 | |

* cited by examiner a
After the basic 8-element array has been rotated once and superimposed twice.

A direct 24-element array and a basic 8-element array has been rotated once, twice, as well as the sound field synthesis of three states.

METHOD AND DEVICE FOR GENERATING SYNTHETIC VORTEX SOUND FIELD WITH MORE MODE NUMBER

TECHNICAL FIELD

The present invention belongs to the technical field of acoustic wave imaging, and in particular relates to a method and device for generating synthetic vortex sound field (SVSF) with more mode number.

BACKGROUND TECHNOLOGY

At present, the research on vortex sound field (VSF) is still in the stage of theoretical exploration and preliminary laboratory test. Because the sound wave has no polarization or spin effect, VSF has no spin angular momentum and can only carry orbital angular momentum (OAM). As a new degree of freedom for acoustic manipulation, the acoustic orbital angular momentum (AOAM) has important scientific significance and application value. Theoretically, using the multiplexing technology of AOAM can improve the channel capacity of underwater acoustic signal transmission and ensure high transmission accuracy for underwater high-speed communication. The increase of AOAM mode number (referred as mode number hereinafter) can improve azimuth resolution, which is of great significance for non-destructive testing in industry, medicine and so on.

In the prior art, VSF (including vortex ultrasonic field) is usually generated by a transducer array (such as a circular array) formed by arrangement of a plurality of transducer units. The mode number of VSF generated by this method is limited by the number of transducer units in the transducer array, that is, the mode number of sound field generated by the transducer array composed of N units is less than N/2. Therefore, in order to obtain the VSF with more mode number, we can only increase the number of transducer units in the transducer array. This will increase the complexity of the equipment, and in order to provide the space to accommodate more transducer units, the volume of the equipment will also be increased, which is not conducive to the application of VSF. This means that it is impossible to generate a VSF with a more mode number in a small radius plane. At present, there is a lack of other research on improving the OAM mode number of VSF.

Content of the Invention

In view of the lack of relevant research on improving the mode number of AOAM of VSF in the prior art, the present invention provides a method and device generating SVSF with more mode number, which aims to generate an infinite mode number by using a limited number of transducer units as well as adjusting the position and phase of each transducer in the array.

A method for generating SVSF with more mode number includes the following steps:

(1) A transducer array composed of N transducer units is constructed, and each transducer unit emits a sound field to generate an initial sound field;

(2) At the same time, the position of the transducer unit and the phase of the sound field emitted by each transducer unit are changed, and each change produces a sound field, and thus changing s times produces s of sound fields, wherein the way to change the position of the transducer unit is to rotate the transducer array as a whole;

(3) The initial sound field generated in step (1) is superimposed with s of sound fields generated in step (2), to obtain SVSF with more mode number;

wherein N and s are integers of >0, and N*s is not less than 4.

Preferably, the transducer array forms a virtual synthetic transducer array before and after rotation, and the number of array elements in the synthetic transducer array is $N_s$, $N_s=(s+1) \times N$.

Preferably, the array elements of the synthetic transducer array are arranged on one ring or a concentric ring consisted of at least two rings. Preferably, the array elements on each ring are evenly arranged.

Preferably, the array elements of the synthetic transducer array are arranged on one ring, and the phase of the sound field generated by the m-th array element in the synthetic transducer array is:

$$\alpha' * \frac{2\pi(m-1)}{N_s},$$

wherein $1 \leq m \leq N_s$, m is an integer, $\alpha'$ is the mode number of said SVSF, $$-\frac{N_s}{2} < \alpha' < \frac{N_s}{2}.$$

Preferably, in the transducer array, the transducer units are arranged on a ring, and the rotation axis of the transducer array passes through the center of the ring; preferably, the transducer array is evenly arranged on the ring.

Preferably, the phase of the sound field generated by the nth transducer unit at the initial position is:

$$\alpha' * \frac{2\pi(n-1)}{N},$$

wherein $1 \leq n \leq N$, n is an integer, and $\alpha'$ is the synthetic mode number, $$-\frac{N_s}{2} < \alpha' < \frac{N_s}{2};$$

and/or the angle for each rotation of the transducer array is $$\frac{2\pi}{N_s},$$

and thus after the nth transducer unit rotates for the ith time, the phase of the generated sound field is:

$$\alpha' * \frac{2\pi(n-1)}{N} + \alpha' * \frac{2\pi}{N_s} * i,$$

wherein $1 \leq i \leq s, 1 \leq n \leq N$, i and n are integers, and $\alpha'$ is asynthetic mode number of SVSF, $$-\frac{N_s}{2} < \alpha' < \frac{N_s}{2}.$$

The present invention also provides a VSF generated by the method mentioned above.

The present invention also provides the use of the VSF mentioned above in underwater communication or acoustic imaging.

The present invention also provides a device generating a SVFD with more mode number, which includes a rotating device and at least one transducer array composed of transducer units, and the rotating device is used to drive the transducer array to rotate;

preferably, in the transducer array, the transducer units are evenly arranged on a ring; the rotating shaft by which the rotating device drives the transducer array to rotate passes through the center of the ring formed by the arrangement of transducer units; preferably, the rotating device is a precision rotating table.

The present invention also provides the use of the device mentioned above in the equipment of underwater communication or acoustic imaging.

In the present invention, the symbol "*" indicates multiplication. "Super mode number" means a rather more number of modes. The synthetic vortex ultrasonic field generated by the method of the present invention using a limited number of transducer units has a significantly more number of modes (i.e. a more number of maximum synthetic modes) than that generated by the prior art.

The method of "sound field superposition" is the vectors of the expressions (or measured values) for the initial sound field generated in step (1) and s of sound fields generated in step (2) are added, to obtain a new expression (a measured value), and the sound field represented by the new expression (the measured value) is the superimposed sound field. The expression denotes the sound pressure expression of the detection point T(r, φ, θ).

"An axis of a ring" denotes the center line on the ring, which passes through the center of the ring and is perpendicular to the plane of the ring.

The present invention has the following advantages: (1) it can simply and effectively increase the number of AOAM modes, obtain a higher mode of vortex ultrasonic field, and then improve the directivity and azimuth resolution of VSF. (2) By the technical solution of the present invention, the number of AOAM modes can be increased using a limited number of transducer units, to generate a higher mode of VSF, which overcomes the limitation that the number of transducer units must be increased to increase the number of AOAM modes in the prior art, so that the device for generating a high mode of VSF can have a simpler structure and smaller volume, and that provides a technical route for realizing high-resolution imaging by acoustic wave. (3) The construction of a higher mode of VSF can increase the capacity of system information acquisition.

Therefore, the method and device for generating VSF in the present application can be used for underwater communication or acoustic imaging, achieve the effect of improving its channel capacity and/or resolution, and thus has a good application prospect.

Obviously, based on the above content of the present invention, according to the common technical knowledge and the conventional means in the field, without department from the above basic technical spirits, other various modifications, alternations, or changes can further be made.

By following specific examples of said embodiments, the above content of the present invention is further illustrated. But it should not be construed that the scope of the above subject matter of the present invention is limited to the following examples. The techniques realized based on the above content of the present invention are all within the scope of the present invention.

EXAMPLES

The technical solution of the present application was further illustrated in the following by specific examples.

Figure 1:
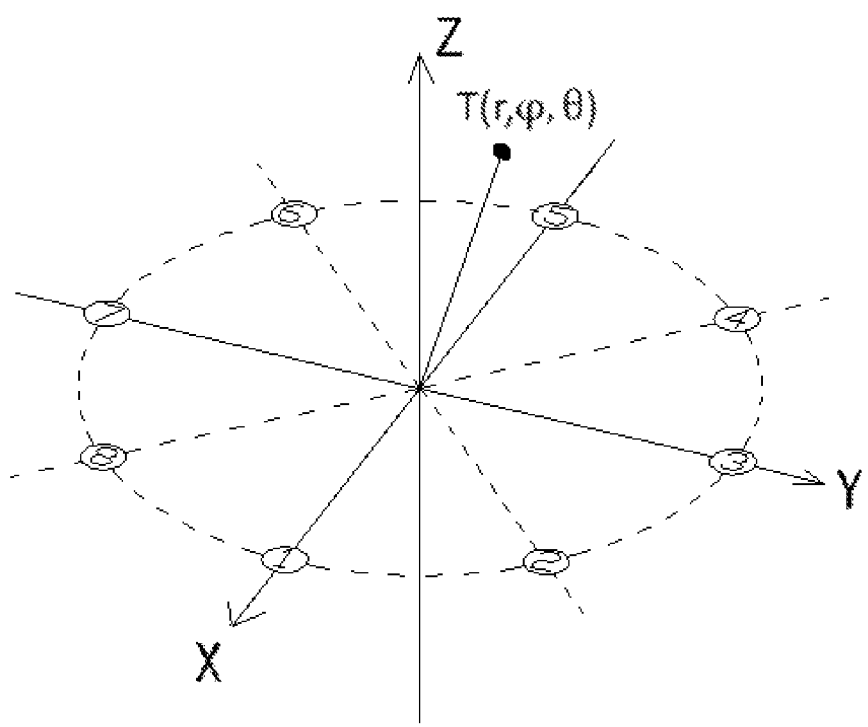
FIG. 1. The schematic diagram of a uniform circular transducer array.

In the prior art, the method generating a VSF by a uniform circular transducer array was as follows: Assuming that the uniform circular array composed of N circular transducers is located in the XOY plane, As shown in FIG. 1, the array radius is R, and the modulation azimuth of the nth transducer (i.e. the phase of the generated sound field) was $\phi_n=2\pi(n-1)\alpha/N$, α is the number of topological charges (i.e. the number of modes). An excitation signal was applied to each transducer:

$$s_n = A^* \exp(j2\pi ft + j\phi_n) \quad (1\text{-}1)$$

where A is the amplitude of the sound wave, f is the signal frequency, t is the time, and j is the imaginary unit.

Supposing that the coordinate of observation point T in a rectangular coordinate system was (x, y, z), and its coordinate in a spherical polar coordinate system is(r, φ, θ) (wherein r is the distance between the observation point and the coordinate origin, φ is the angle of the line between the observation point and the origin of coordinate axis from X-axis, and θ is the angle of the line between the observation point and the origin of coordinate axis from Z-axis), the sound pressure detected at the observation point is:

$$p_T = \frac{A}{R_n}\exp(j2\pi ft + j\phi_n + jkR_n) \quad (1\text{-}2)$$

wherein k is the wave number, $\varphi_n$ is the spatial azimuth of the transducer in the spherical coordinates, $\varphi_n = \phi_n/\alpha$, $R_n$ is the distance from any transducer to the observation point T, $R_n$ could be expressed as:

$$R_n = \sqrt{(r\sin\theta\cos\varphi - R\cos\varphi_n)^2 + (r\sin\theta\sin\varphi - R\sin\varphi_n)^2 + r\cos\theta^2} \quad (1\text{-}3)$$

When N of transducers are superimposed, the sound pressure at the detection point T(r, φ, θ) could be expressed as:

$$p_n = \exp(-j\omega t)\sum_{n=1}^{N}\frac{A}{R_n}\exp(j\phi_n + jkR_n) \quad (1\text{-}4)$$

The complex exponential form of formula (1-4) was expanded into a trigonometric function form:

$$\hat{p}_n = \frac{A}{R_n}\cos\left[kR_n + 2\alpha\pi\frac{(n-1)}{N}\right] + j\frac{A}{R_n}\sin\left[kR_n + 2\alpha\pi\frac{(n-1)}{N}\right] \quad (1\text{-}5)$$

After multiple transducers are superimposed, the amplitude expression of the sound field was as follows:

$$P = \sqrt{\sum_{n=1}^{N}\left\{A\cos\left[kR_n + 2\alpha\pi\frac{(n-1)}{N}\right]/R_n\right\}^2 + \sum_{n=1}^{N}\left\{A\sin\left[kR_n + 2\alpha\pi\frac{(n-1)}{N}\right]/R_n\right\}^2} \quad (1\text{-}6)$$

The phase expression of the formed sound field was as follows:

$$\phi = \arctan\frac{\sum_{n=1}^{N}\left\{A\sin\left[kR_n + 2\alpha\pi\frac{(n-1)}{N}\right]/R_n\right\}}{\sum_{n=1}^{N}\left\{A\cos\left[kR_n + 2\alpha\pi\frac{(n-1)}{N}\right]/R_n\right\}} \quad (1\text{-}7)$$

Figure 2:
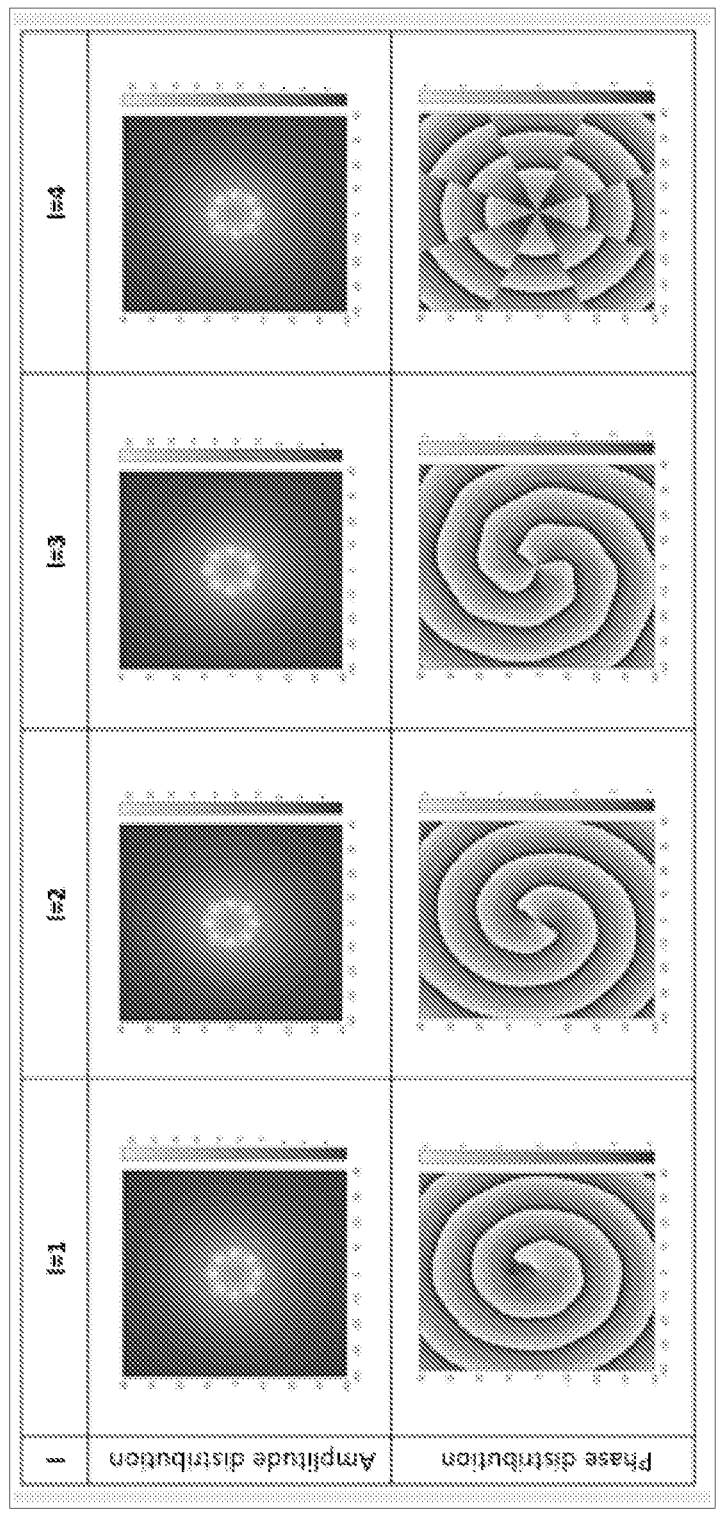
FIG. 2. The vortex ultrasonic field with a mode number of 1 (a), 2 (b) and 3 (c) obtained by 8 uniform circular transducer arrays in the prior art; and a schematic diagram of 8 transducer units unable to generate a VSF with a mode number of 4 (E)

The experimental parameters used were the frequency f=1000 Hz, the sound velocity c=340 m/s, the sound amplitude A=1, the number of array elements N=8, the number of modes α=1, 2, 3, 4, and the array radius R=0.2 m. The VSF obtained by formula (1-6) and formula (1-7) is shown in FIG. 2. According to FIG. 2, when α=4, the VSF could not be formed. The characteristic of VSF was that the central sound intensity was 0, and the wave front in the propagation direction was spiral. Its characteristics were originated from the phase distribution of wavefront linear variation.

Example

VSF for the SOAM with More Mode Number According to the Present Invention

In this example, the parameters were defined as follows:
The number of original transducer units was N;
The number of transducer elements in the synthetic transducer array was $N_s$; $N_s=(s+1)\times N$;
The synthetic mode number was α', α' was an integer, and met the following requirements:

$$-\frac{N_s}{2} < \alpha' < \frac{N_s}{2};$$

If there are N of original transducer units, the number of vortex field modes that could be formed was α, which was an integer, and met the following requirements:

$$-\frac{N}{2} < \alpha < \frac{N}{2}.$$

If the synthetic mode number was α', the modulation phase difference between two adjacent transducer units in the synthetic transducer array was:

$$\Delta\phi_s = 2\pi\frac{\alpha'}{N_s}.$$

Figure 3:
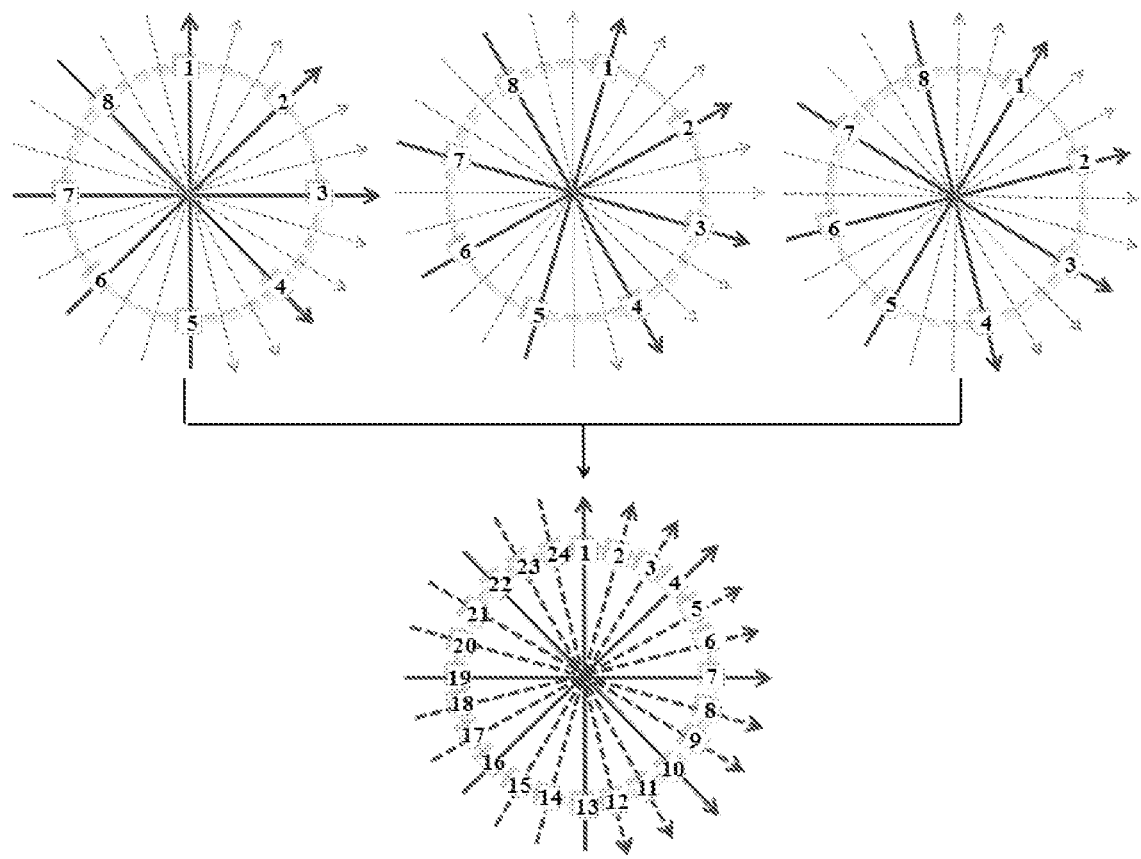
FIG. 3. A schematic diagram of the state of the basic array formed by the transducer unit before rotation and after two rotations, and the synthetic transducer array formed by them.

The rotation number of the transducer array was recorded as s;

Synthetic transducer array denotes the array formed by taking the position of each transducer unit as an array, when each transducer unit used to synthesize a VSF generated a sound field. For example, in the prior art, when the transducer array was not rotated, the synthetic transducer array was the original transducer array. If the transducer array was rotated once (as shown in FIG. 3), the synthetic transducer array was a combination of the original transducer array and the transducer array obtained after rotation (as shown in the right figure of FIG. 3).

Therefore, in order to obtain a greater α', it is necessary to increase the number $N_s$ of transducer units in the synthetic transducer array. In the traditional method, the number N of original transducer units must be increased. For the present method, it was only needed to increase the rotation times s of the original transducer array.

In particular, the operation method of this example was:
(1) N transducer units were evenly distributed on the ring with radius of R, and the obtained annular transducer array was controlled by the precision rotary table, which could drive the annular transducer array to rotate in the set direction (clockwise or counterclockwise).
(2) If a virtual vortex sound field with a mode number of α' was synthesized, at the initial position, the phase of the sound field generated by the nth transducer unit was $$\alpha' * \frac{2\pi(n-1)}{N},$$

in which $$-\frac{N_s}{2} < \alpha' < \frac{N_s}{2}.$$

(3) If a synthetic transducer array with $N_s$ of synthetic array elements was required, the annular transducer array needed to be rotated k−1 times, to allow $N_s$=kN. The ring was controlled by the precision rotary table, which would drive the transducer array to rotate in the set direction (clockwise or counterclockwise). The angle of the ring transducer array rotated each time is:

$$\frac{2\pi}{N_s}.$$

After the transducer array was rotated i times (1≤i≤s), the phase of the sound field successively transmitted by the nth transducer was:

$$\alpha' * \frac{2\pi(n-1)}{N} + \alpha' * \frac{2\pi}{N_s} * i,$$

in which $$-\frac{N_s}{2} < \alpha' < \frac{N_s}{2}.$$

(4) By superimposing the original sound fields with different mode numbers formed at different positions of the array, the VSF with SOAM mode numbers could be synthesized.

The method of "sound field superposition" was: the vectors of the expressions (or measured values) for the initial sound field generated in step (1) and s of sound fields generated in step (2) were added, to obtain a new expression (a measured value), and the sound field represented by the new expression (the measured value) was the superimposed sound field. The expression denoted the sound pressure expression of the detection point T(r, φ, θ).

Figure 4:
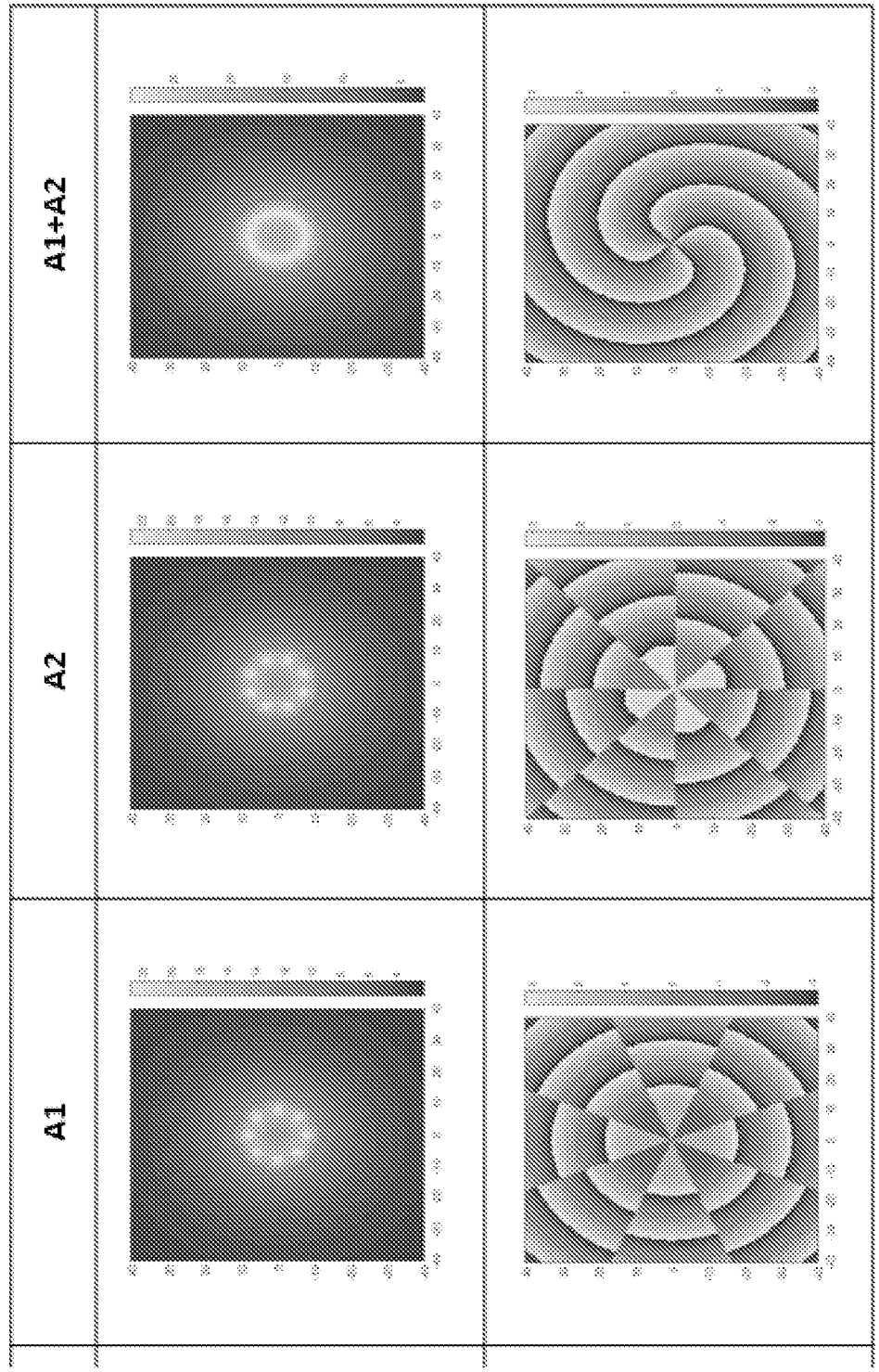
FIG. 4. A schematic diagram of a VSF with a mode number of 4 generated by rotating the transducer basic array with N=8 once in the example and simulating $N_s$=16 transducer arrays.
Figure 5:
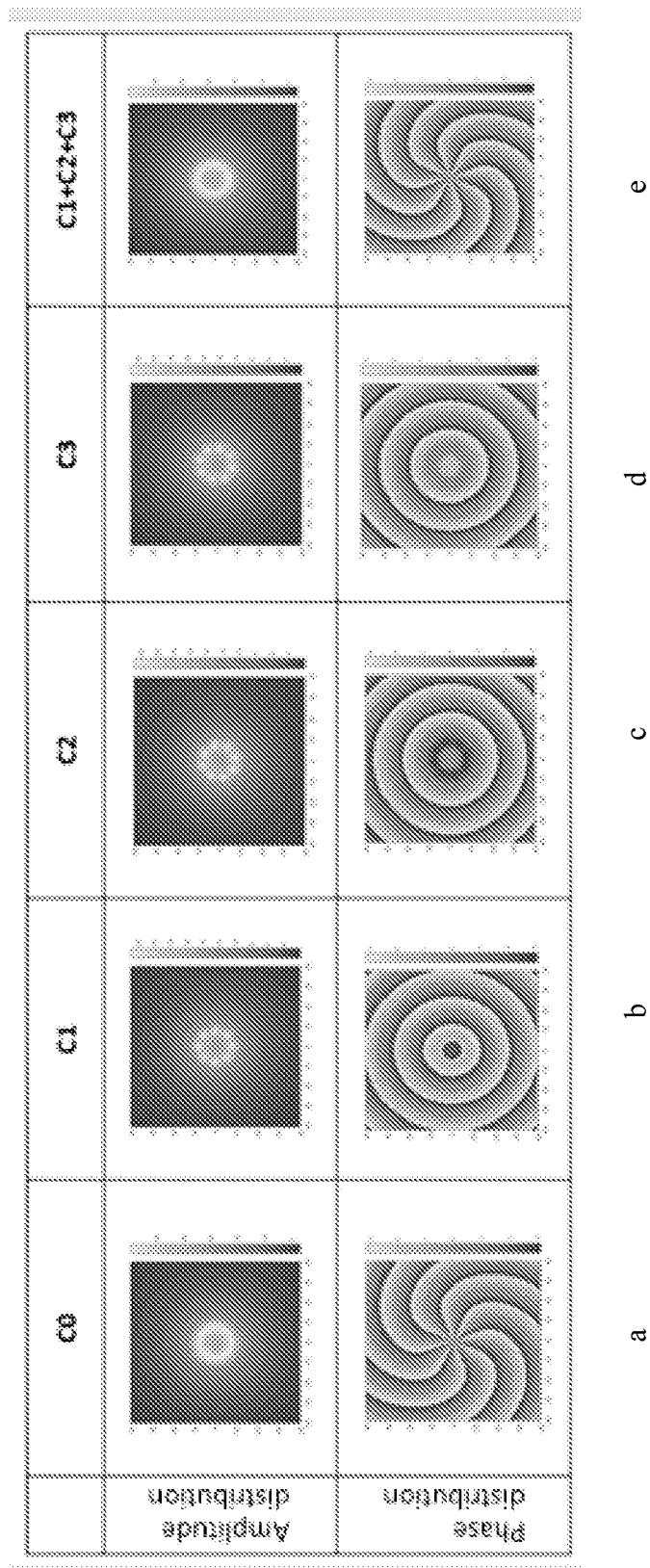
FIG. 5. A schematic diagram of a VSF with a mode number of 8 generated by rotating the transducer basic array with N=8 twice in the example and simulating $N_s$=24 transducer arrays.

As the operation of the above method, the result was shown in FIG. 4. The sound field with a mode number of 4 (equal to N/2) was generated by the transducer basic array with N=8, as shown in FIG. 4 panel a, and then the sound field with a mode number of 4 was generated by rotating the basic array once, as shown in FIG. 4 panel b. Both of generated sound fields were superimposed to simulate the VSF with a mode number of 4 generated by $N_s$=16 transducer arrays, as shown in FIG. 4 panel c. As shown in FIG. 5, the sound field with a mode number of 8 was generated directly with the transducer basic array of N=24, as shown in FIG. 5 panel a. If the basic transducer array with N=8 was used to generate the synthetic vortex sound field with a mode number of 8, the array needed to be rotated twice. After the spatial position of the array was rotated, the phase needed to be changed. The initial sound field generated by the transducer basic array with N=8 was shown in FIG. 5 panel b; after rotating the transducer base array with N=8 once, and the phase of the sound field emitted by each transducer unit was correspondingly changed, the generated sound field was shown in FIG. 5 panel c; after rotating the transducer base array with N=8 again, and the phase of the sound field emitted by each transducer unit was correspondingly changed, the generated sound field was shown in FIG. 5 panel d; after superimposing the sound fields emitted by the array at three different spatial positions, the synthetic vortex sound field with a mode number of 8 was obtained as shown in FIG. 5 panel e. Using the above method, the synthetic vortex sound field with a mode number of 8 was generated by 8 transducer units. As shown, this method could generate VSF having more mode number with less transducer units. Other parameters of this example were consistent with those used in the above method of VSF generated by uniform circular transducer array.

In order to demonstrate the advantages of the present application, the directivity of the sound field generated by this example was described below. The directivity function of the circular transducer array used in this example is:

$$D_s = \frac{1}{N}\sum_{n=1}^{N} e^{-j\frac{2\pi f * R}{c}\sin\theta\cos\frac{2\pi * n}{N}} \cdot \frac{2J_a\left(\frac{2\pi f}{c}a\sin\theta\right)}{\frac{2\pi f}{c}a\sin\theta} \quad (1\text{-}7)$$

wherein R is the array radius, c is the sound velocity, j is the imaginary unit, and a is the radius of the transducer unit.

Figure 6:
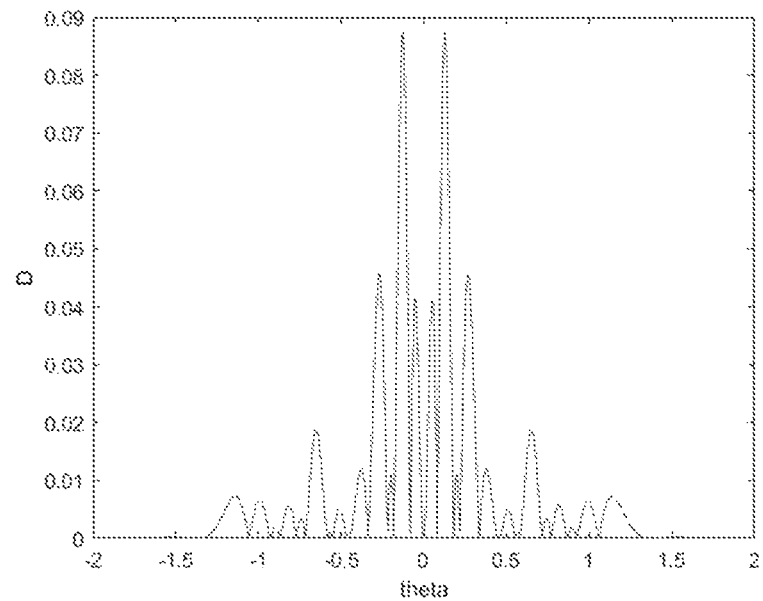
FIG. 6. The directivity of a VSF with a mode number of 3 directly generated by the transducer basic array with N=8 in the example.
Figure 7:
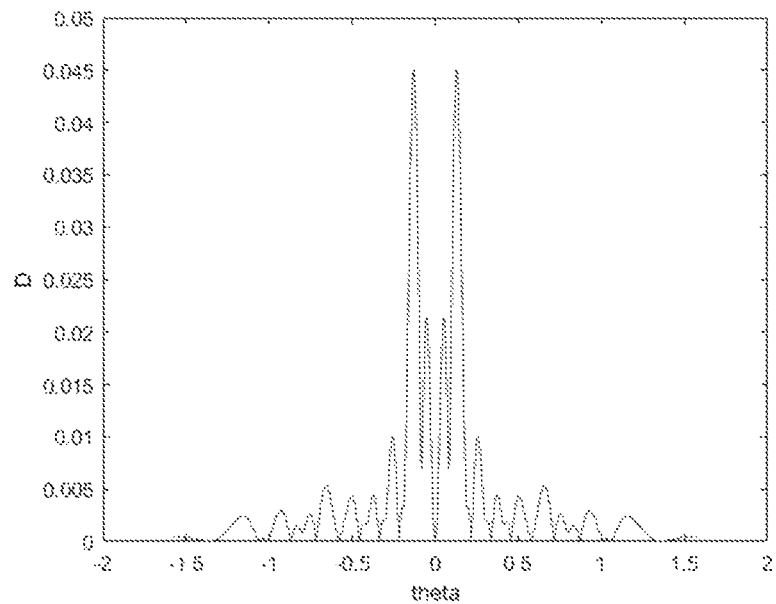
FIG. 7. The directivity of a VSF with a mode number of 3 synthesized by this method using the transducer basic array with N=8 in the example.
Figure 8:
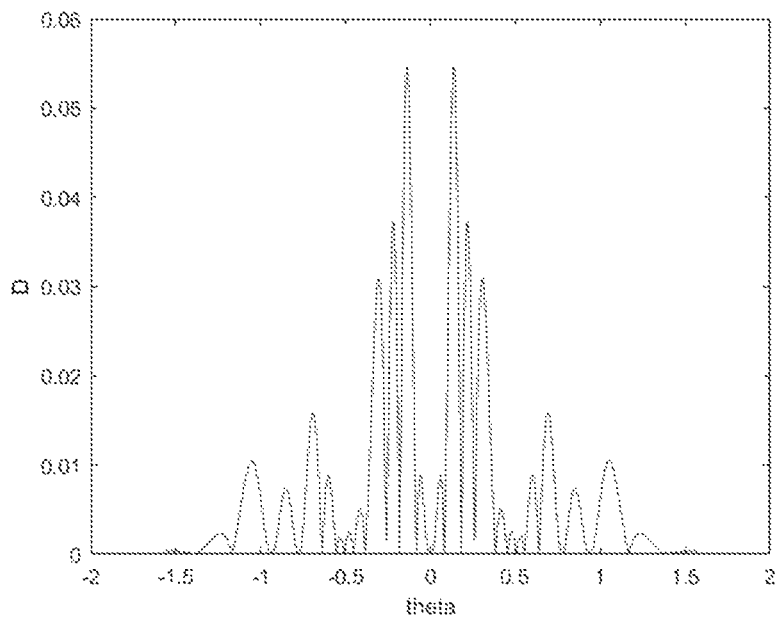
FIG. 8. The directivity of a VSF with a mode number of 4 generated by the transducer basic array with N=8 in the example.
Figure 9:
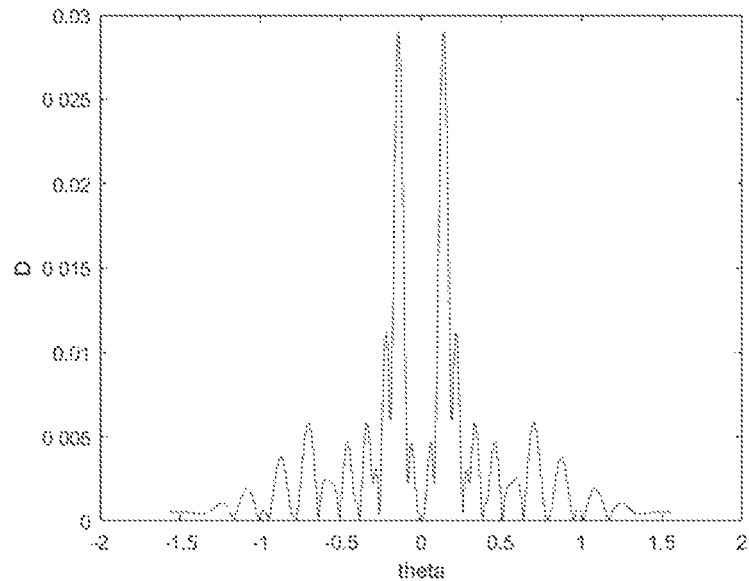
FIG. 9. The directivity of a VSF with a mode number of 4 synthesized using this method by rotating the transducer basic array with N=8 once in the example.

FIG. 6 is the directivity of a VSF with a mode number of 3 directly generated by the transducer basic array with N=8; FIG. 7 is the directivity of a VSF with a mode number of 3 synthesized by this method using the transducer basic array with N=8 in the example;

FIG. 8 is the directivity of a VSF with a mode number of 4 generated by the transducer basic array with N=8 in the example; FIG. 9 is the directivity of a VSF with a mode number of 4 synthesized using this method by rotating the transducer basic array with N=8 once in the example.

Obviously, by comparison of FIG. 6 and FIG. 7 as well as by directivity. Therefore, it had better imaging resolution and better transmission performance in the process of imaging and data transmission.

From the above example, it could be shown that the present application could synthesize a VSF with more mode number by rotating the transducer array composed of less transducer units, adjusting the phase of each transducer unit, and superimposing the VSF generated after each rotation with that generated before rotation. Compared with the prior art, the synthetic vortex ultrasonic field generated by the method of the present invention had better directivity. Applying this method to underwater communication, biomedical imaging and other equipment could reduce the number of transducer units and thus simplify the equipment. The information carrying capacity and imaging resolution could be increased as the increase of the mode number of VSF; the enhancement of directivity also made it have better imaging resolution and better transmission performance in the process of imaging and data transmission. Therefore, the application potential of the technology of the present invention was significant.

The invention claimed is:

1. A method for generating synthetic vortex sound field (SVSF), comprising:
    (a) constructing a transducer array comprising N transducer units arranged in a circular pattern and each transducer unit is spaced apart from another of the N transducer units;
    (b) emitting from each transducer unit, a first individual sound field so that the N transducer units generate an initial sound field;

(c) rotating the transducer array as a whole from a first position to a second position, thereby changing a position of each transducer unit;

(d) emitting from each transducer unit a second individual sound field so that the N transducer units generate a second sound field;

(e) repeating step (d) a number (s−1) of times to produce a (s−1) number of sound fields, whereby the transducer array changes position a (s−1) number of times; and (f) superimposing the initial sound field generated in step (1) with the s number of sound fields generated in steps (d) and (e) to obtain the SVSF, wherein N and s are integers of >0, and N*s is not less than 4.

2. The method according to claim 1, wherein rotating the transducer array as a whole the s number times so that the N transducer units have a total of $N_s=(s+1)\times N$ different transducer positions, and forms a virtual synthetic transducer array having an equivalent of $N_s$ array elements.

3. The method according to claim 2, wherein array elements of said synthetic transducer array are arranged on one circle or on at least two concentric circles.

4. The method according to claim 3, wherein the array elements of said virtual synthetic transducer array are arranged on one circle, and a phase of the sound field generated by the m-th array element in the synthetic transducer array is:

$$\alpha' * \frac{2\pi(m-1)}{N_s},$$

wherein $1 \leq m \leq N_s$, m is an integer, $\alpha'$ is the mode number of said SVSF, and $$-\frac{N_s}{2} < \alpha' < \frac{N_s}{2}.$$

5. The method according to claim 3, wherein the array elements on each circle are evenly spaced apart.

6. The method according to claim 1, wherein the N transducer units are arranged on one circle having an axis perpendicular to the circle, and the transducer array is configured to rotate about the axis.

7. The method according to claim 6, wherein a phase of the sound field generated by the nth transducer unit at the initial position is:

$$\alpha' * \frac{2\pi(n-1)}{N},$$

wherein $1 \leq n \leq N$, n is an integer, and $\alpha'$ is the mode number of said SVSF, and $$-\frac{N_s}{2} < \alpha' < \frac{N_s}{2};$$

8. The method according to claim 6, wherein each rotation of the transducer array is by an angle of $$\frac{2\pi}{N_s},$$

whereby, after the nth transducer unit rotates for the ith time, the phase of the $$\alpha' * \frac{2\pi(n-1)}{N} + \alpha' * \frac{2\pi}{N_s} * i,$$

generated sound field is:

wherein $1 \leq i \leq s$, $1 \leq n \leq N$, i and n are integers, and $\alpha'$ is the mode number of SVSF, and $$-\frac{N_s}{2} < \alpha' < \frac{N_s}{2}.$$

9. The method according to claim 1, further comprising placing the transducer array underwater and carrying out steps (b) to (e).

* * * * *